April 6, 1926. Re. 16,314

J. E. KENNEY

WASHING MACHINE

Original Filed May 31, 1923 2 Sheets-Sheet 1

Inventor

John E Kenney

By Geisler & Ramsey

Attorney

April 6, 1926.

Re. 16,314

J. E. KENNEY

WASHING MACHINE

Original Filed May 31, 1923 2 Sheets-Sheet 2

Inventor

John E. Kenney

By Geisler & Ramsey

Attorney

Reissued Apr. 6, 1926. Re. 16,314

UNITED STATES PATENT OFFICE.

JOHN E. KENNEY, OF PORTLAND, OREGON, ASSIGNOR TO JOSEPH E. DUNNE, OF PORTLAND, OREGON.

WASHING MACHINE.

Original No. 1,493,987, dated May 13, 1924, Serial No. 642,607, filed May 31, 1923. Application for reissue filed December 13, 1924. Serial No. 755,802.

*To all whom it may concern:*

Be it known that I, JOHN E. KENNEY, a citizen of the United States, and resident of Portland, county of Multnomah, State of Oregon, have invented a certain new and useful Improvement in Washing Machines, of which the following is a specification.

My invention relates specifically to washing machines which do not necessarily include a tub, but which are adapted to be mounted on any suitable tub.

My invention in further particulars relates to washing machines of the dolly-head type that is which comprise a rocking or oscillating head provided with pendant prongs or fingers by which the clothes are engaged and agitated in the washing liquid. It has been attempted heretofore to make said dolly head and its pendant fingers hollow, and to install a pump element in the dolly head or its pendant fingers. But with such arrangement, the water was alternately sucked into and then ejected again from said fingers. Such action tended to subject the clothes to undue wear, since when the pump exerted its suction action it tended to pull the clothes into the orifices of the fingers. Besides, the resistance offered to the pump action, while said orifices were covered by the clothes during the suction stroke of the pump, tended to impose undue work on the latter.

The object of my invention is to provide a washing machine of the character referred to in which said undesirable detrimental features are eliminated.

I attain my object by providing a hollow head and providing the latter with hollow pendant fingers, through which streams of the washing liquid are continuously ejected by the operation of a pump element located outside of the washing liquid preferably mounted on the cover of the tub. In this way, the washing operation is facilitated by the simultaneous agitation of the clothes and the ejection of the washing liquid through the latter, without the clothes being subjected to undue wear.

Furthermore, in order to facilitate the washing operation, I cause the streams of washing liquid ejected by the pendant fingers to be ejected with sufficient force to penetrate the clothes; and the same arrangement also tends to keep the clothes more or less spread out, that is to say, prevents it from wadding up, which would tend to keep portions of the clothes out of contact with the washing liquid.

A further improvement of my invention has for its purpose the simplification of the devices operating the pump and simultaneously rocking the agitating head. The above mentioned and incidental features are hereinafter fully described and are illustrated in the accompanying drawings in which.

Fig. $2^a$ is a view showing detail of construction.

Figure 1:
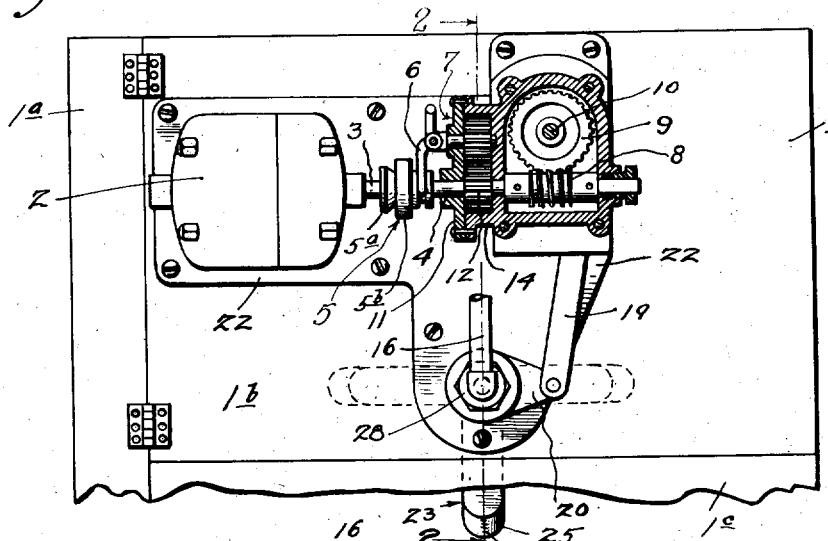
Fig. 1 is a plan view of my device mounted on a hinged base and shows the pump and connecting mechanism in section 1, taken approximately on a line of 1—1 of Fig. 2.
Figure 2:
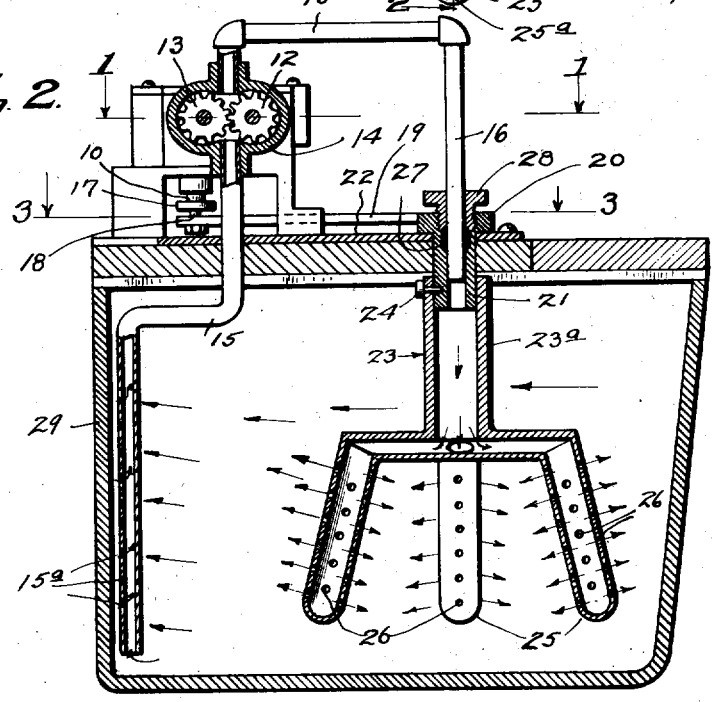
Fig. 2, is a section taken on a line 2—2 of Fig. 1 and shows by arrows the approximate flow of water through the machine.
Figure 2A:
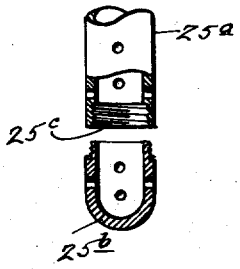
Figure 3:
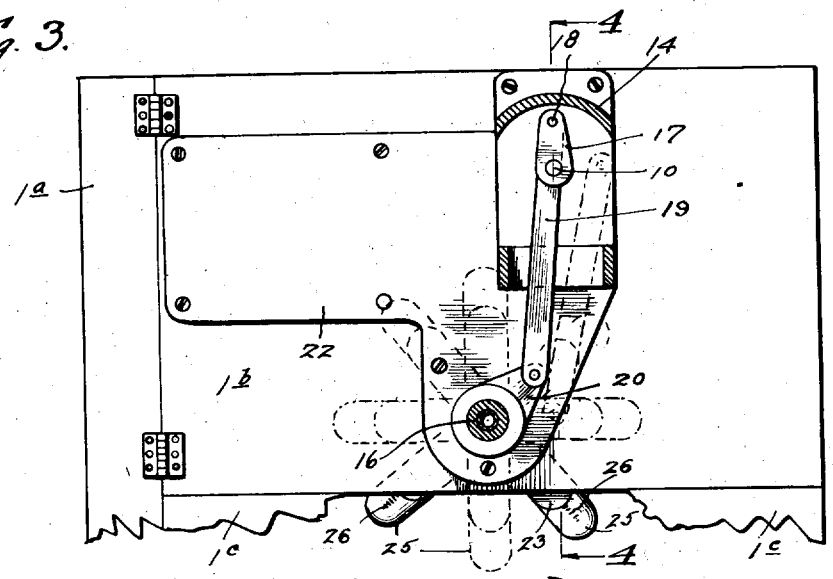

Fig. 3, is a view taken on the line 3—3 of Fig. 2 and shows in dotted lines the approximate position of the oscillatible washing head.

Figure 4:
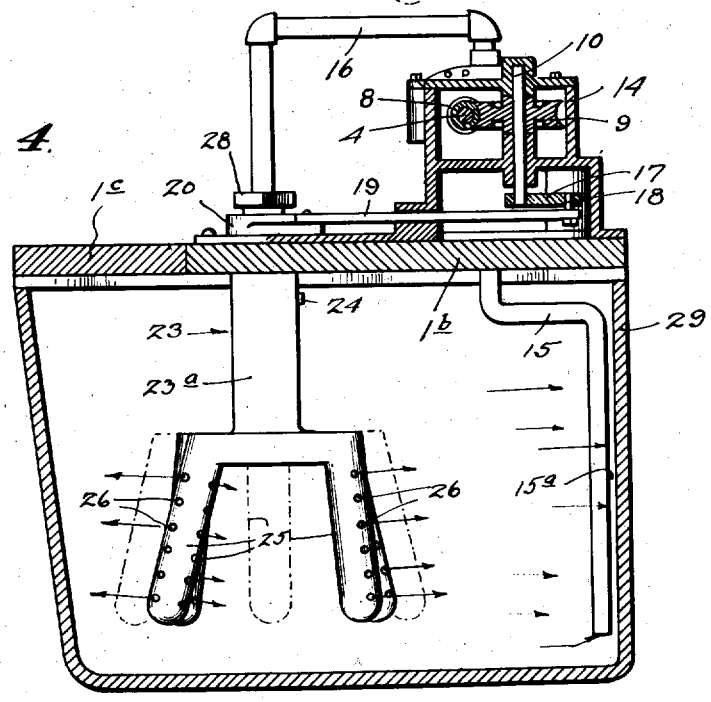

Fig. 4, is a section taken on the line 4—4 of Fig. 3 and the arrows showing the approximate circulation of the water through the tub.

My device is mounted on a portable base, which is made of a plurality of pieces. The portion $1^a$ is clamped to the tub 29 at one side, and the portions $1^b$ and $1^c$ are hingedly attached thereto. The washing mechanism is mounted on the base $1^b$ which covers the major portion of the top of the tub and the portion $1^c$ covers substantially the remainder. There is no mechanism mounted on section $1^c$ and thus it can be readily raised upward and thus provide easy access into the tub without lifting the mechanism. A prime mover, as the motor 2, is mounted on the base $1^b$ and rotates the shaft 3. Another shaft 4 is held in axial alinement with the shaft 3 and is releasably connected thereto by means of a clutch 5. The male half $5^a$ of the clutch is fixed to the shaft 3 and the female half $5^b$ is slidably attached to the shaft 4 but is keyed against differential rotation therewith. A clutch lever 6 pivoted to the frame 7 of the mechanism, moves this clutch member $5^b$ into and out of operative connection with the member $5^a$. A worm 8 is mounted on the shaft 4 and meshes with the worm gear 9 which is mounted on vertical shaft 10 which is journaled in the frame at its upper and lower ends. The pump 11 is also mounted so as to be rotated by the shaft 4 and in the drawings we have shown this pump as a rotary pump which has a gear 12 mounted on the shaft 4 and an idling gear 13, meshing therewith. These gears rotate in a closely fitting casing 14 and draw water through the suction pipe 15 and force it up into the pipe 16. An arm 17 is mounted on the end of the shaft 10 and has a pin 18 affixed near its end, the pin and arm forming a crank. The connecting rod 19 is connected with this pin on one end and to the crank arm 20 on its opposite end, thus the rotation of the shaft 10 causes the oscillation of the crank 20. Crank 20 is integral with the hollow stub shaft 21, which is journaled in the tub top $1^b$. I provide a plate 22 covering a relatively large portion of this cover, on which this stub shaft and crank bears so that wear may be reduced to the minimum. The oscillating washing head 23 is provided with a hollow shank $23^a$ which is connected to the said stub shaft 21 by means of pin 24. The washing head is also hollow and is provided with a number of hollow prongs 25 which are perforated as 26. The pipe 16 extends into the hollow stub shaft 21 and the connection is made watertight by means of packing 27 which is held in place by a packing nut 28. Water is thus forced into the washing head and it escapes through the perforations 26. The supply of water for the pump 14 is obtained through the inlet pipe 15, which has perforations as $15^a$. The suction pipe 15 lies closely along the side of the tub and the perforations $15^a$ are preferably arranged on the inner face of this pipe so they will not be readily clogged by the clothes in the tub, thus a plentiful supply of water can always be assured for the pump. As shown in Fig. $2^a$, prongs $25^a$ for my device may be made with removable ends, as $25^b$ which may be screwed into the end of the prong $25^a$ at a point as $25^c$. Thus the hollow washing head and its prongs may be cleaned readily.

The jets of liquid emitted from the dolly head should have sufficient force to exercise a substantial repelling effect upon the clothing. The mere ejection of these jets without impinging or repelling force would have no appreciable effect in removing said clothes from the engaging portions of the dolly head. The jets would merely supply a flow of washing liquid to the clothes at the point at which they are gripped. The ejecting of said jets into the clothes without a mechanical device for oscillating, as opposed to completely rotating the dolly or stirrer head, would also be ineffective because the clothes would not tend to change their relationships relatively to the member emitting said jets and thus said jets would affect only one portion of the clothes. If a device were used that rotated continuously the clothes would be firmly gripped by said device and the repelling effect of a jet of washing liquid would be ineffective in removing said clothes from said stirrer or dolly head. The clothes thus being gripped in one portion only would become wadded up and thus only a portion of the clothes would be washing by being dragged, by the fingers, through the washing liquid until said clothes were either pulled off or torn off. The same difficulty is present in oscillating dolly type washers, but in a lesser degree, where the jets of washing liquid are not present inasmuch as the clothes often are not released at the point of reciprocation. I have discovered that if jets of washing liquid are directed against the clothes along said fingers with sufficient force, however, the clothes will be removed from the dolly head each time said dolly head changes its direction of rotation.

While the drawings show the devices employed by me to be arranged so as to operate with a circulatory effect, that is, the pump initially drawing the washing liquid from the tub, ejecting it into the clothes, and then drawing the liquid back into the pump for a second cycle, and continuing such circulatory action, it may be found that if my invention is used for a larger scale of work, for example, in a laundry, that it would be undesirable to recirculate the same washing liquid or water over and over, because the liquid may soon be too polluted for circulation through the clothes belonging to different customers. For laundry use, especially, the washing liquid had better be discharged from the container through which the water flows, or is driven, in its passage from the dolly head, after it has been used a single time.

The operation of my device is as follows:

Power is obtained from the motor 2 which rotates the shaft 3, the shaft 4 can be connected so as to rotate therewith by forcing in the clutch 5. The shaft 4 in rotating not only transmits power through the speed reduction gears, but also actuates the pump which causes water to flow through the device. The rotation of the worm 8 causes the rotation of the worm gear 9 which rotates the shaft 10 and thus the crank arm 17.

The rotation of the crank arm 17 and its pin 18 causes the longitudinal and angular movement of the connecting rod 19. The arm 20 is slightly longer than the crank arm 17 and thus the rotation of the shaft 10 causes only partial oscillating rotation of the stub shaft 21. The washing head is thus oscillated back and forth. The rotation of the pump causes water to be drawn in through the perforations $15^a$ in the pipe 15 and forces the water through the pipe 16 into the hollow washing head 23 and through the perforation 26 and thus through the clothes in the tub.

I claim:

1. In a washing machine of the character described, comprising a cover adapted to be mounted on a tub, a pump, mounted on the cover and provided with an outflow pipe, a rotatable hollow head depending centrally from said cover and into which said outflow pipe extends, said hollow head provided with pendant hollow perforated fingers, and means for oscillating said hollow head.

2. In a washing machine of the character described, comprising a cover adapted to be mounted on a tub, a pump, mounted on the cover and provided with an outflow pipe, a pendant hollow stub-shaft rotatably mounted in said cover into which stub-shaft said outflow pipe extends, a hollow head depending from said stub-shaft, said hollow head provided with pendant hollow perforated fingers, and means for oscillating said hollow stub-shaft.

3. In a washing machine of the character described, comprising a cover adapted to be mounted on a tub, a pump, mounted on the cover and provided with an outflow pipe, a pendant hollow stub-shaft rotatably mounted in said cover into which stub-shaft said outflow pipe extends, a detachable hollow head depending from said stub-shaft, said hollow head provided with pendant hollow perforated fingers, and means for oscillating said hollow stub-shaft.

4. In a washing machine of the character described, a cover, a rotatable hollow head depending centrally from said cover, said hollow head provided with pendant hollow perforated fingers, means for oscillating said hollow head, and means for ejecting water under pressure through said hollow head.

5. In a washing machine of the character described, a cover, a rotatable hollow head depending centrally from said cover, said hollow head provided with pendant hollow perforated fingers, means for oscillating said hollow head, and means for ejecting water under pressure through said hollow head, the perforations of said fingers being of small bore so as to eject jets of sufficient force to penetrate the clothes and also to tend to keep the sections of the clothes separated from each other.

6. In a washing machine of the character described, comprising a cover adapted to be mounted on a tub, a pump, mounted on the cover and provided with an outflow pipe, a rotatable hollow head depending centrally from said cover and into which said outflow pipe extends, said hollow head provided with pendant hollow perforated fingers, and means for oscillating said hollow head, the perforations of said fingers being of small bore so as to eject jets of sufficient force to penetrate the clothes and also to tend to keep the sections of the clothes separated from each other.

7. In a washing machine of the character described, comprising a cover adapted to be mounted on a tub, a pump, mounted on the cover and provided with an outflow pipe, a rotatable hollow head depending centrally from said cover and into which said outflow pipe extends, said hollow head provided with pendant hollow perforated fingers, means for oscillating said hollow head, the inlet pipe of said pump being arranged to extend close to one side wall of the tub.

8. In a washing machine of the character described, comprising a cover adapted to be mounted on a tub, a pump, mounted on the cover and provided with an outflow pipe, a rotatable hollow head depending centrally from said cover and into which said outflow pipe extends, said hollow head provided with pendant hollow perforated fingers, and means for oscillating said hollow head, the inlet pipe of said pump being arranged to extend close to one side wall of the tub and being provided with perforations on that side opposed to said side wall.

9. In a washing machine, a tub having a hollow head therein, a remotely located inlet supply for the head and means for effecting a continuous repellent discharge of washing liquid under pressure from said head.

10. In a washing machine, a tub having a hollow head oscillated therein, an inlet for said head spaced therefrom and means for effecting a continuous repellent discharge of washing liquid under pressure from said head.

11. In a washing machine, a tub, having a hollow head journaled therein, means for oscillating said head, and means for effecting a continuous repellent discharge of washing liquid under pressure from said head, said means including an inlet for and spaced from said head said head being provided with a plurality of small orifices adapted to emit jets with impinging force.

12. In a washing machine of the character described, a mounting, a hollow perforated stirrer head journaled in said mounting, an inlet for said head spaced therefrom and adapted to be arranged in a tub, means for oscillating said head, and means for effecting a constant discharge of washing liquid from said head.

13. In a washing machine of the character described, a tub, a hollow perforated stirrer head arranged for oscillation in said tub, means for oscillating said head, and a pump having an inlet pipe arranged to extend into said tub at a point spaced from said head, said pump effecting a constant discharge of the washing liquid contained in said tub from said head.

14. In a washing machine of the character described, a mounting, a hollow perforated stirrer head journaled in said mounting and adapted to be arranged in a tub, means for oscillating said head, a pump having an inlet pipe arranged to extend into said head, said pump effecting a constant discharge of the washing liquid contained in said tub through said head.

15. In a washing machine of the character described, a hollow perforated stirrer head, an inlet for said head spaced therefrom, means for oscillating said head, means for effecting a constant discharge of washing liquid through said head, the perforations of said head being of small bore as to eject jets of sufficient force to penetrate the clothes and also to tend to keep the sections of clothes separated from each other.

16. In a washing machine of the character described, a hollow perforated stirrer head, means for oscillating said head, a pump effecting a constant discharge of washing liquid through said head, the perforations of said head being of small bore so as to eject jets of sufficient force to penetrate the clothes and also to tend to keep the sections of clothes separated from each other.

17. A portable washing machine attachment for tubs comprising a portable support adapted to be mounted on a tub, a hollow perforated stirrer head rotatably carried by said support, a pump mounted on said support and connected to and adapted to effect a continuous discharge through said head, and means for operating said pump and oscillating said head.

18. A portable washing machine attachment for tubs, a portable support adapted to be mounted on a tub, a hollow perforated stirrer head rotatably carried by said support, a pump mounted on said support and connected to and adapted to effect a continuous discharge through said head, and means for operating said pump and oscillating said head, said pump having an inlet pipe arranged to dip in the washing liquid contained in said tub.

19. A portable washing machine attachment for tubs comprising a portable support adapted to be mounted on a tub, a hollow perforated stirrer head rotatably carried by said support, a pump mounted on said support and connected to and adapted to effect a continuous discharge through said head, a motor mounted on said support, and means connected to the motor for operating said pump and oscillating said head.

20. A portable washing machine attachment for tubs comprising a portable support adapted to be mounted on a tub, a hollow perforated stirrer head rotatably carried by said support, a pump mounted on said support and connected to and adapted to effect a continuous discharge through said head, a motor on said support, and means connected to the motor for operating said pump and oscillating said head, said pump having an inlet pipe arranged to dip in the washing liquid contained in said tub.

21. In a washing machine, a tub having a hollow head mounted for oscillation therein, said head being formed with perforations of small bore, and means remote from the head to draw washing fluid from the tub and force it under pressure into the head, whereby to effect a continuous repellent discharge of washing liquid from the perforations in the head.

JOHN E. KENNEY.